United States Patent [19]

Medwin

[11] Patent Number: 4,853,868
[45] Date of Patent: Aug. 1, 1989

[54] METHOD FOR SIMULATING LAYUP OF PREPREG MATERIALS FOR THREE-DIMENSIONAL MOLDING OF COMPOSITE PARTS

[75] Inventor: Steven J. Medwin, Wilmington, Del.

[73] Assignee: E. I. Du Pont de Nemours and Company, Wilmington, Del.

[21] Appl. No.: 113,025

[22] Filed: Oct. 23, 1987

[51] Int. Cl.⁴ .................. G06F 15/46; G05B 19/00
[52] U.S. Cl. ................................ 364/476; 364/473; 364/188; 425/141; 425/412; 425/423
[58] Field of Search ............... 364/473, 476, 564, 168, 364/171, 188; 428/294, 103; 425/141, 171, 412, 423; 156/58, 156

[56] References Cited

U.S. PATENT DOCUMENTS

| | | | |
|---|---|---|---|
| 3,711,350 | 1/1973 | Witzel, III | 156/169 |
| 3,930,920 | 1/1976 | Kicherer | 156/156 |
| 3,932,923 | 1/1976 | DiMatteo | 29/407 |
| 4,133,711 | 1/1979 | August et al. | 156/353 |
| 4,487,730 | 12/1984 | Larribe | 264/40.1 |
| 4,534,813 | 8/1985 | Williamson et al. | 156/58 |
| 4,549,864 | 10/1985 | Larribe | 425/145 |
| 4,641,270 | 2/1987 | Lalloz et al. | 364/476 |
| 4,677,020 | 6/1987 | Takagi et al. | 264/103 |

Primary Examiner—Jerry Smith
Assistant Examiner—P. Gordon

[57] ABSTRACT

A computer-aided method for predicting the layup of fiber-reinforced prepreg resin material for compression molding into three-dimensional shapes depends on the area relationships of the final thickness of the molded shape to the initial thickness of the prepreg material. A graphic display is generated incorporating the initial thickness needed at each location on the prepreg material to provide the desired final thickness of the three-dimensional shape with controlled fiber distribution throughout the shape.

6 Claims, 4 Drawing Sheets

METHOD FOR SIMULATING LAYUP OF PREPREG MATERIALS FOR THREE-DIMENSIONAL MOLDING OF COMPOSITE PARTS

BACKGROUND OF THE INVENTION

This invention relates to compression molding of three-dimensional shaped composite structures, and more particularly it relates to a computer-aided method for laying up of fiber-reinforced resin prepreg materials prior to molding.

Known methods for compression molding of fiber-reinforced composite materials generally include a hand layup of prepreg material in a mold or using a planar sheet of the material and then forming the shape desired by heating and then compressing the sheet in the mold. In molded shapes requiring high fiber volume and high fiber alignment, the above processes are less than satisfactory because of the inability to precisely control the final fiber location. For example, in the case of resin reinforced with continuous filament fiber materials, the fibers will overlap and wrinkle as they try to conform to complex three-dimensional mold shapes. When the resin is reinforced with discontinuous fibers, such as disclosed in U.S. Pat. No. 4,552,805 the sheet structure will readily draw during the forming process without wrinkling. However, the fiber volume fraction will tend to decrease in areas of high draw in the mold. This results in lower strength and modulus in these high draw areas.

Attempts to compensate for this have been made by hand laying patches of material in those areas of high draw in the mold. The problem of determining the exact location of those areas in the planar sheet and the exact amount of additional material required in those areas has not been addressed in the prior art.

SUMMARY OF THE INVENTION

A computer-aided method for simulating the locations and amount of additional fiber reinforced prepreg material required in those areas on a planar sheet of the material to be used with a compression mold for molding three-dimensional shapes of predetermined thicknesses is provided and includes the following steps: stretching a thin elastic sheet material over the male portion of the mold, said sheet material having indicia thereon representing division of the surface of said sheet into equal initial area units, compressing the stretched thin elastic sheet material with a transparent replica of the female portion of the mold and determining the final area of each of said units after the elastic sheet material has been stretched and compressed. The average of the final unit areas in each region of the sheet the size of which is determined from the mean fiber length is then calculated. The locations and initial thicknesses needed at each location is determined by the following relationship:

$$T_I = A_F/A_I \times T_F$$

wherein $T_I$ is the initial thickness needed at each location of the sheet material before compression molding.

$A_F$ is the average of the unit areas within a region on the elastic sheet material after it has been stretched and compressed, $A_I$ is the initial area of the indicia units on the sheet material before it has been stretched, and $T_F$ is the desired final thickness of each location of the three-dimensional molded shape.

A graphic display is generated on the computer screen of the sheet material incorporating the initial thicknesses needed at each location on the sheet material to mold the shape desired.

The resin used can be either thermoplastic or thermoset.

In a preferred embodiment, the molded shape has a uniform thickness with uniform fiber distribution throughout.

DETAILED DESCRIPTION OF THE PREFERRED EMBODIMENT

Figure 1:
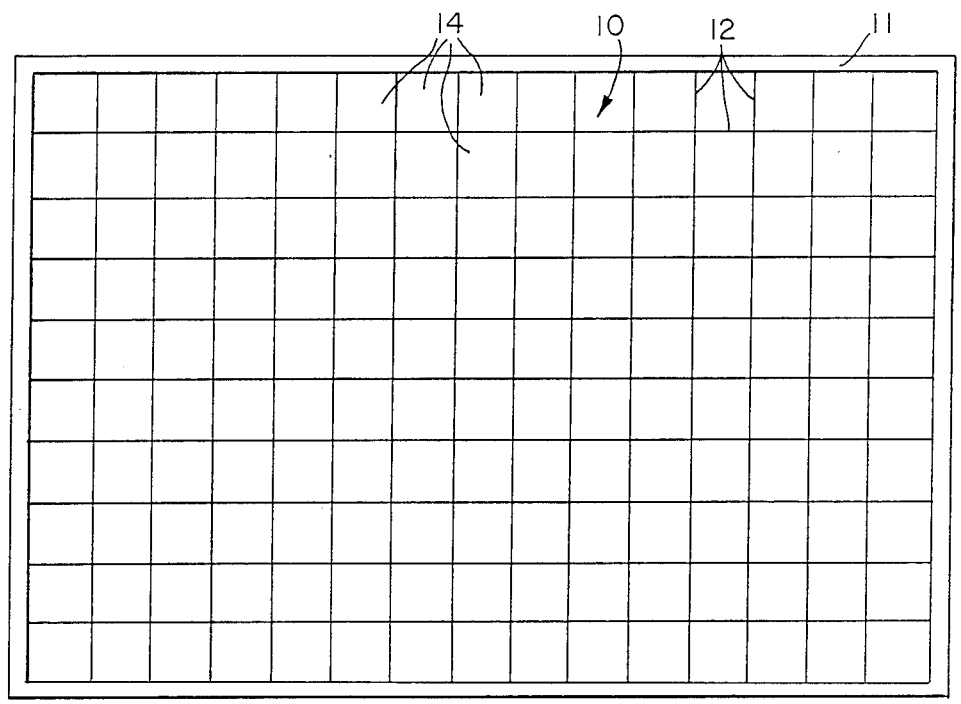
FIG. 1 is a top view of the elastic sheet material in its unstretched form.
Figure 2:
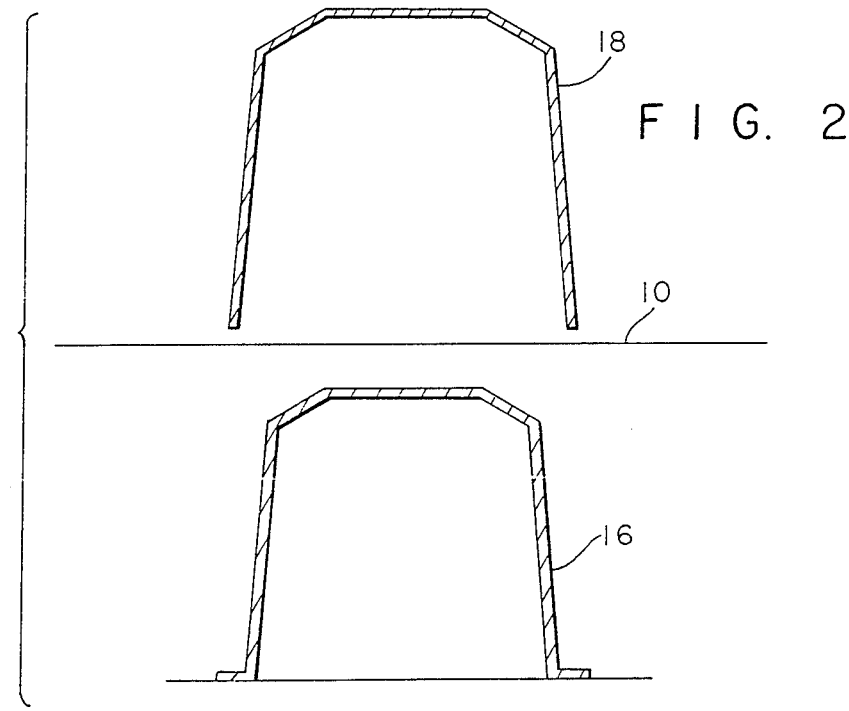
FIG. 2 is a schematic cross-sectional view of a female and male portions of a mold with the elastic material of FIG. 1 placed in between prior to stretching.
Figure 3:
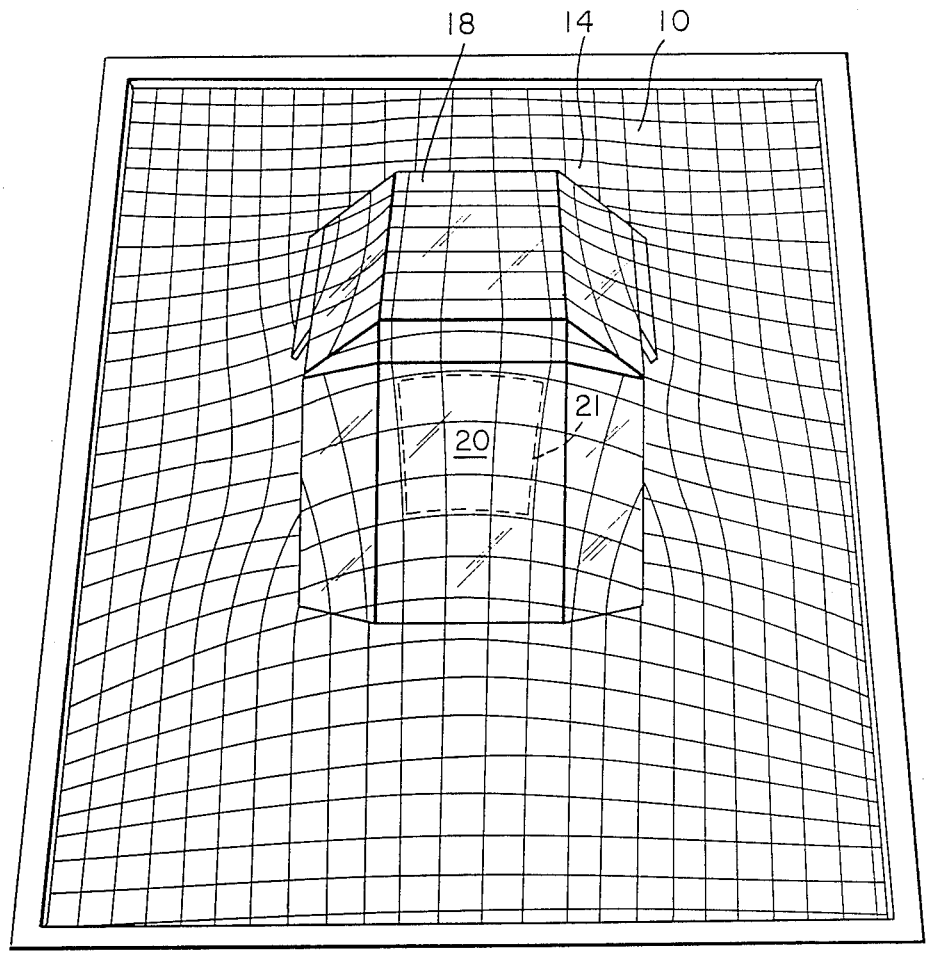
FIG. 3 is a perspective view of the compression mold having a thin elastic material stretched over the male portion of the mold with a transparent female portion of the mold in place.

The method of this invention illustrated in the drawings includes an elastic sheet material 10 shown in FIG. 1 clamped to a frame 11. The sheet 10 has lined indicia 12 forming a grid of square unit areas 14. FIG. 2 shows a cross-sectioned view of a three-dimensional compression mold having a male portion 16 and a female portion 18 with the elastic sheet material 10 placed in between. The female portion is fashioned from a rigid transparent material. Referring now to FIG. 3, the sheet material 10 is shown stretched over the male portion 16 of the compression mold and compressed into the final shape by the transparent female portion 18. As can be seen each of unit areas 14 of the elastic sheet are deformed to enlarged unit areas 20. The final area of each of the units 20 is determined by measuring the peripheral lengths and the diagonal of each unit 20 and calculating the area according to the formula for trapeziums found on page 152 in the section entitled Areas and Volumes of Machinery's Handbook, 21st Edition. The final unit area is determined by averaging all the unit areas in a region 21 immediately surrounding the unit area. The size of the region 21 is a function of the mean discontinuous fiber length in the reinforced sheet material. In the embodiment illustrated, the length of each side of region 21 is equal to the mean fiber length or three times the length of a side of a unit area 20.

Figure 4:
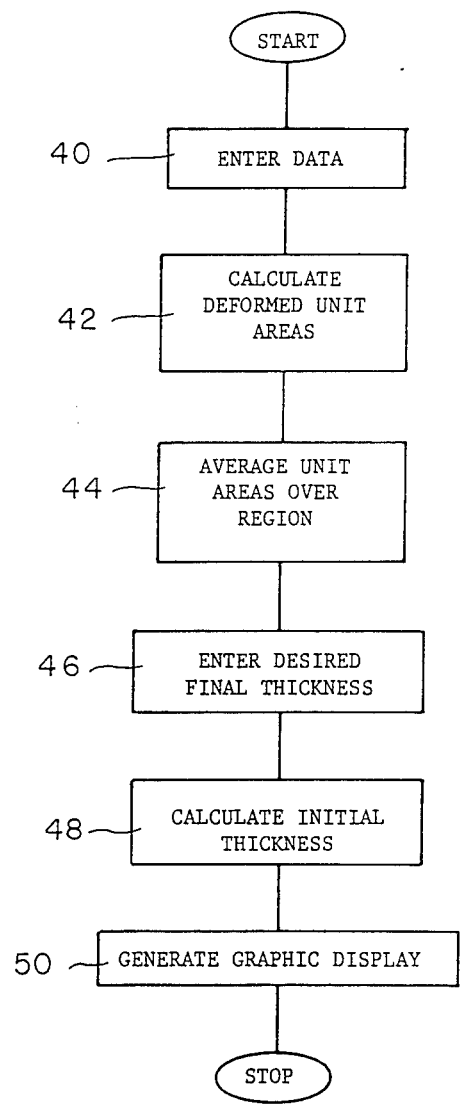
FIG. 4 is a flow diagram of the computer program used to implement the method of this invention.
Figure 5:
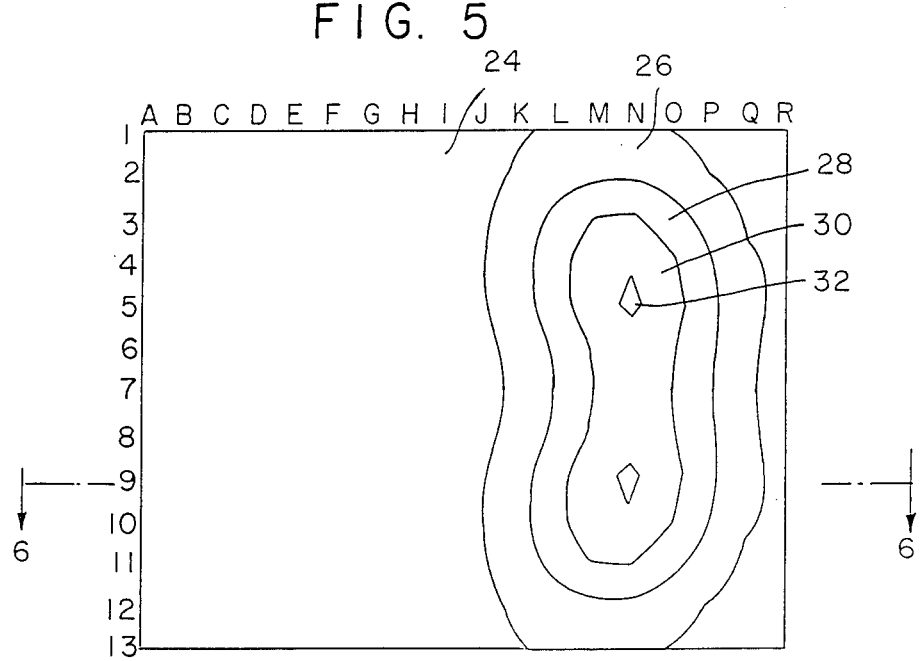
FIG. 5 is an illustration of the graphic display of the sheet material incorporating the initial thicknesses needed at each location on the sheet material prior to molding.

A digital computer useful in performing the above calculations is an Apple Computer, Inc., Macintosh Plus Model M2513/A, which is operated according to the program in FIG. 4. More particularly, in step 40 the lengths of each side of the unit area 20 and its diagonal are entered into the computer. In addition, the initial unit area $A_I$ of square unit areas 14 is entered into the computer. The computer program then calculates in step 42 the deformed unit area $A_F$ of the unit area 20 according to the above referenced formula. In step 44, the average unit area 20 at each location is calculated by averaging all the unit areas in the corresponding regions 21. The desired final thickness $T_F$ of the molded part is then entered into the computer in step 46. Following this in step 48, the initial thickness $T_I$ at each location is calculated by the above-noted formula. The initial thickness can be specified as a number of plies of a predetermined thickness. Finally a graphics display as shown in FIG. 5 is generated on the computer screen in step 50. This display is in the form of a contour map highlighting the areas 24-32 of differing thicknesses computer along with the 8 mil per ply thickness of the composite material. Based on the data entered, the computer generated a detailed contour plot as shown in FIG. 4 and a table of values corresponding to the number of plies required at each location on the contour plot to form a uniformly thick seat (Table I below). The contour plot generated by the computer comprises a two-dimensional figure representing each additional four plies of prepreg material. In practice, the number of plies in each of the areas designated 24-32 are rounded to the nearest even integer to ensure a balanced prepreg. For example, area 24 uses 22 plies, area 26, uses 26 plies, etc. A prepreg is then formed, according to FIG. 7 from the contour information generated from the contour plot represented in FIGS. 5 and 6, placed in a compression mold and a contoured seat was molded of uniform thickness throughout.

TABLE I

Figure 6:
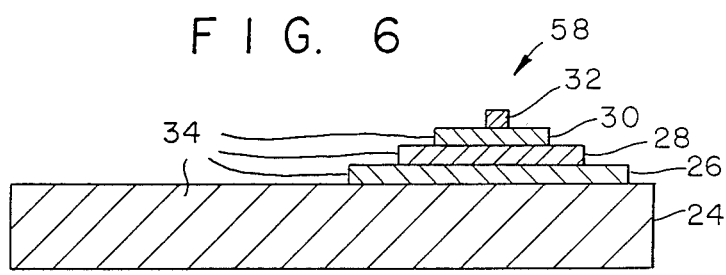
FIG. 6 is a section of FIG. 5 taken along sections lines 6—6.

TABLE OF NUMBER OF PLIES AT EACH LOCATION:

| Row | A | B | C | D | E | F | G | H | I | J | K | L | M | N | O | P | Q | R |
|---|---|---|---|---|---|---|---|---|---|---|---|---|---|---|---|---|---|---|
| 1 | 23 | 23 | 23 | 23 | 23 | 23 | 23 | 23 | 24 | 25 | 26 | 26 | 27 | 27 | 26 | 25 | 24 | 24 |
| 2 | 23 | 23 | 23 | 23 | 23 | 23 | 23 | 23 | 24 | 25 | 26 | 28 | 29 | 29 | 28 | 26 | 25 | 24 |
| 3 | 23 | 23 | 23 | 23 | 23 | 23 | 24 | 24 | 24 | 26 | 28 | 31 | 34 | 34 | 32 | 28 | 25 | 25 |
| 4 | 23 | 23 | 25 | 23 | 23 | 23 | 24 | 24 | 25 | 26 | 29 | 33 | 37 | 38 | 35 | 30 | 26 | 25 |
| 5 | 23 | 23 | 23 | 23 | 23 | 23 | 23 | 24 | 24 | 26 | 28 | 33 | 37 | 39 | 36 | 31 | 27 | 25 |
| 6 | 23 | 23 | 23 | 23 | 23 | 23 | 23 | 23 | 24 | 25 | 27 | 31 | 35 | 37 | 35 | 31 | 27 | 25 |
| 7 | 23 | 23 | 22 | 22 | 23 | 23 | 23 | 23 | 24 | 25 | 27 | 30 | 34 | 36 | 34 | 30 | 26 | 25 |
| 8 | 23 | 23 | 23 | 23 | 23 | 23 | 23 | 23 | 24 | 25 | 27 | 31 | 35 | 37 | 35 | 31 | 27 | 25 |
| 9 | 23 | 23 | 23 | 23 | 23 | 23 | 24 | 24 | 26 | 28 | 33 | 37 | 39 | 36 | 31 | 27 | 25 | |
| 10 | 23 | 23 | 23 | 23 | 23 | 23 | 24 | 24 | 25 | 26 | 29 | 33 | 37 | 38 | 35 | 30 | 26 | 25 |
| 11 | 23 | 23 | 23 | 23 | 23 | 23 | 24 | 24 | 24 | 26 | 28 | 31 | 34 | 34 | 32 | 28 | 25 | 25 |
| 12 | 23 | 23 | 23 | 23 | 23 | 23 | 23 | 23 | 24 | 25 | 26 | 28 | 29 | 29 | 28 | 26 | 25 | 24 |
| 13 | 23 | 23 | 23 | 23 | 23 | 23 | 23 | 23 | 24 | 25 | 26 | 26 | 27 | 27 | 26 | 25 | 24 | 24 | which represents a prepreg 58 of a number of plies 34 as shown in FIG. 6.

Figure 7:
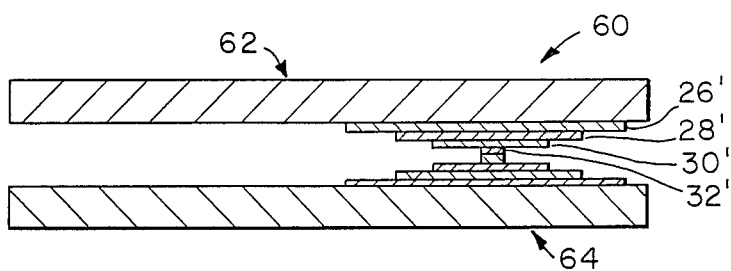
FIG. 7 is a schematic side elevation view of a prepreg assembled from the information obtained from the graphic displays of FIGS. 5 and 6.

A prepreg 60 as shown in FIG. 7 is then formed from the contour information generated in FIGS. 5 and 6 in the following manner. Two prepregs 62, 64 each area 24'-32' being one-half the thickness of the areas 24-32 in prepreg 58 are placed facing each other as shown. In a series of tests, contoured seats were formed of uniform thickness.

EXAMPLE

A panel of fiber reinforced resin material composed of 75% by volume Kevlar ® aramid fiber with a mean fiber length of 3 inches in an amorphous polyamide copolymer thermoplastic resin was simulated for compression molding a contoured seat. The desired final thickness of the seat was to be 0.151 inches. A half-scale model of the mold was fabricated with the female portion of the mold being a transparent material. A thin elastic sheet material 5 mils thick by 12 inches wide by 18 inches long was marked with one half inch square grid pattern. This material was clamped in a frame around its peripheral edge. Then it was stretched over the male portion of the mold. The transparent female portion was mated to the male portion under pressure to cause the elastic sheet material to deform to the shape of the mold. The unit areas of the deformed grid were in the shape of trapeziums which were then traced onto the outside surface of the transparent female mold.

Detailed measurements of the sides and diagonal of each trapezium were then made and entered into the digital computer programmed according to the flow chart shown in FIG. 3. The average unit area of the unit areas in each three by three unit area regions of the sheet was then calculated in the computer. The initial unit area 14 of 0.27 square inches was entered into the

I claim:

1. A computer-aided method for simulating the initial thicknesses needed for initial area units of a fiber reinforced resin sheet material needed to provide a predetermined final thickness for said initial unit areas after said fiber reinforced resin sheet material and said initial unit areas have been stretched into a three-dimensional shape in a compression mold having male and female portions, said method comprising:

stretching a thin elastic sheet material over the male portions of the mold, said elastic sheet material having indicia thereon dividing said elastic material into said initial unit areas;

compressing the stretched thin elastic material with a transparent replica of the female portion of said mold;

determining the final unit areas of each of said initial unit areas after the thin elastic sheet has been stretched and compressed;

averaging said final unit areas in a plurality of regions of the thin elastic sheet;

determining the initial unit thicknesses needed for the initial unit areas of said fiber reinforced resin sheet material according to the following relationship $$T_I = A_F/A_I \times T_F$$

wherein $T_I$ is the initial thickness needed at each location of the sheet material before compression molding;

$A_F$ is the average of the unit areas within a region on said thin elastic sheet material after it has been stretched and compressed;

$A_I$ is the area of the initial unit areas on the thin elastic sheet material before it has been stretched; and $T_F$ is the predetermined final thickness for said initial unit areas after said fiber reinforced resin sheet material has been stretched into said three-dimensional shape; and generating a graphic display of said fiber reinforced resin sheet material to be used with said compression mold for molding said three-dimensional shape, said display incorporating the initial thickness needed at initial unit areas on said fiber reinforced resin sheet material to mold said three-dimensional shape.

2. The method of claim 1 wherein said predetermined final thickness is uniform throughout said three-dimensional shape.

3. The method of claim 1 wherein said initial thickness comprises layered plies of said fiber reinforced resin material.

4. The method of claim 3 wherein said plies are of uniform thickness.

5. The method of claims 1, 2, 3, or 4, wherein said resin is a thermoplastic resin.

6. The method of claims 1, 2, 3, or 4, wherein said resin is a B-staged thermoset resin.

* * * * *